United States Patent
Bian et al.

(10) Patent No.: US 6,593,009 B2
(45) Date of Patent: *Jul. 15, 2003

(54) MAGNETIC THIN FILM MEDIA WITH A PRE-SEED LAYER OF CRTI

(75) Inventors: Xiaoping Bian, San Jose, CA (US); Mary Frances Doerner, Santa Cruz, CA (US); Mohammad Taghi Mirzamaani, San Jose, CA (US); Tim Minvielle, San Jose, CA (US); Kai Tang, San Jose, CA (US)

(73) Assignee: Hitachi Global Storage Technologies Netherlands N.V., Amsterdam (NL)

( * ) Notice: Subject to any disclaimer, the term of this patent is extended or adjusted under 35 U.S.C. 154(b) by 51 days.

This patent is subject to a terminal disclaimer.

(21) Appl. No.: 09/798,235

(22) Filed: Mar. 2, 2001

(65) Prior Publication Data

US 2002/0164506 A1 Nov. 7, 2002

(51) Int. Cl.⁷ ............................. G11B 5/66; G11B 5/20
(52) U.S. Cl. .................. 428/611; 428/663; 428/668; 428/666; 428/336; 428/900; 428/694 TS
(58) Field of Search ................. 428/65.6, 65.7, 428/336, 611, 663, 666, 668, 900, 694 TS

(56) References Cited

U.S. PATENT DOCUMENTS

| 5,693,426 A | 12/1997 | Lee et al. ............ 428/611 |
| 5,789,056 A | 8/1998 | Bian et al. |
| 5,879,783 A | 3/1999 | Chang et al. |
| 5,922,456 A | 7/1999 | Tanahashi et al. |
| 5,993,956 A | 11/1999 | Lambeth et al. |
| 6,001,447 A | 12/1999 | Tanahashi et al. |
| 6,010,795 A * | 1/2000 | Chen et al. ............ 428/611 |
| 6,077,586 A | 6/2000 | Bian et al. |
| 6,077,603 A | 6/2000 | Zhang |
| 6,143,388 A | 11/2000 | Bian et al. |
| 6,159,625 A * | 12/2000 | Ueno ............ 428/694 T |
| 6,174,597 B1 * | 1/2001 | Yusu et al. ............ 428/332 |

FOREIGN PATENT DOCUMENTS

| JP | 60076016 | 4/1985 |
| JP | 363187416 | 8/1988 |
| JP | 11110733 | 4/1999 |
| JP | 11232630 | 8/1999 |
| JP | 11328646 | 11/1999 |
| JP | 2000-020936 | 1/2000 |

OTHER PUBLICATIONS

T.D.Lee, et al. "A Double Underlayer for Co–Based Longitudinal Recording Thin Film Media," IEEE Transactions on Magnetics, vol. 35, No. 5, Sep. 1999, pp. 2628ff.

T.P.Nolan, et al., "Independent Optimization of Nucleation and Growth Processes of Titanium–alloy Underlayers for Cobalt–alloy Perpendicular Recording Media," Materials Research Soc. Symp. Process. vol. 403, 1996, pp. 713ff.

T.Kanbe,et al., "Effects of underlayer grain size on the microstructure of the magnetic layer in CoCrPt media," IEEE Transactions on Magnetics, vol. 35, No. 5, Sep. 1999, pp. 2667ff.

M.Mirzamaani, et al., "Recording Performance of Thin Film Media With Various Crystallographic Preferred Orientations on Glass Substrates," IEEE Transactions on Magnetics, vol. 34, No. 4, Jul. 1998, pp. 1588ff.

L.Lee, et al., "Seed layer induced (002) crystallographic texture in NiAl underlayers," J. Appl. Physical. 79(8). Apr. 15, 1996.

* cited by examiner

*Primary Examiner*—Holly Rickman
(74) *Attorney, Agent, or Firm*—G. Marlin Knight

(57) ABSTRACT

A thin film magnetic media structure comprising a pre-seed layer CrTi is disclosed. The CrTi pre-seed layer presents an amorphous or nanocrystalline structure. The preferred seed layer is RuAl. The use of the CrTi/RuAl bilayer structure provides superior adhesion to the substrate and resistance to scratching, as well as, excellent coercivity and signal-to-noise ratio (SNR) and reduced cost over the prior art.

17 Claims, 4 Drawing Sheets

MAGNETIC THIN FILM MEDIA WITH A PRE-SEED LAYER OF CRTI

RELATED APPLICATIONS commonly assigned U.S. patent applications bearing Ser. Nos. 09/295,267 and 09/547,439 describe the use of a RuAl seed layer with a B2 crystallographic structure to obtain an underlayer with a preferred in-plane orientation of (200) and a cobalt alloy magnetic film with the preferred in-plane orientation of (11$\bar{2}$0). Co-pending, commonly assigned U.S. patent application bearing Ser. No. 09/500,710 describes the use of an amorphous or nanocrystalline CrTa or AlTi as a pre-seed layer.

FIELD OF THE INVENTION

The invention relates to magnetic thin film media and methods for their fabrication and more particularly to magnetic thin film disks having a pre-seed layer and a seed layer prior to an underlayer.

BACKGROUND OF THE INVENTION

A typical prior art head and disk system 10 is illustrated in FIG. 1. In operation the magnetic transducer 20 is supported by the suspension 13 as it flies above the disk 16. The magnetic transducer 20, usually called a "head" or "slider," is composed of elements that perform the task of writing magnetic transitions (the write head 23) and reading the magnetic transitions (the read head 12). The electrical signals to and from the read and write heads 12, 23 travel along conductive paths (leads) 14 which are attached to or embedded in the suspension 13. The magnetic transducer 20 is positioned over points at varying radial distances from the center of the disk 16 to read and write circular tracks (not shown). The disk 16 is attached to a spindle 18 that is driven by a spindle motor 24 to rotate the disk 16. The disk 16 comprises a substrate 26 on which a plurality of thin films 21 are deposited. The thin films 21 include ferromagnetic material in which the write head 23 records the magnetic transitions in which information is encoded.

The conventional disk 16 consists substrate 26 of AlMg with an electroless coating of NiP which has been highly polished. The thin films 21 on the disk 16 typically include a chromium or chromium alloy underlayer which is deposited on the substrate 26. The ferromagnetic layer in the thin films is based on various alloys of cobalt, nickel and iron. For example, a commonly used alloy is CoPtCr. Additional elements such as tantalum and boron are often used in the magnetic alloy. A protective overcoat layer is used to improve wearability and corrosion. The three film disk described above does not exhaust the possibilities. Various seed layers, multiple underlayers and laminated magnetic films have all been described in the prior art.

In particular, seed layers have been suggested for use with nonmetallic substrate materials such as glass. Typically the seed layer is a relatively thin layer which is the initial film deposited on the substrate and is followed by the underlayer. Materials proposed for use as seed layers include chromium, titanium, tantalum, Ni3P, MgO, carbon, tungsten, AlN, FeAl and NiAl. In U.S. Pat. No. 5,789,056 to Bian, et al., the use of a CrTi seed layer is described. The underlayers mentioned are Cr, CrV and CrTi.

SUMMARY OF THE INVENTION

The applicants disclose a thin film magnetic media structure with a pre-seed layer of CrTi. The CrTi pre-seed layer presents an amorphous or nanocrystalline structure. The preferred seed layer is RuAl. The use of the CrTi/RuAl bilayer structure provides superior adhesion to the substrate and resistance to scratching, as well as, excellent coercivity and signal-to-noise ratio (SNR) and reduced cost over the prior art.

DETAILED DESCRIPTION OF THE INVENTION AND THE PREFERRED EMBODIMENTS

Figure 1:
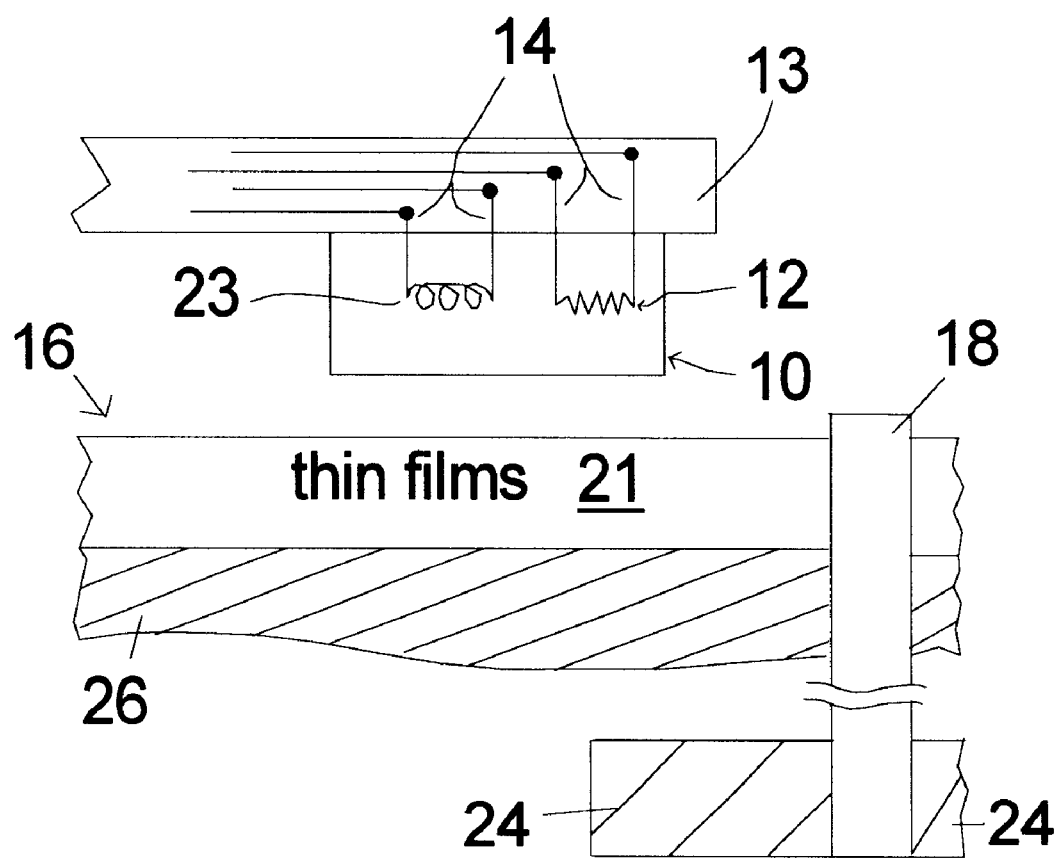
FIG. 1 is a symbolic illustration of the prior art showing the relationships between the head and associated components in a disk drive.
Figure 2:
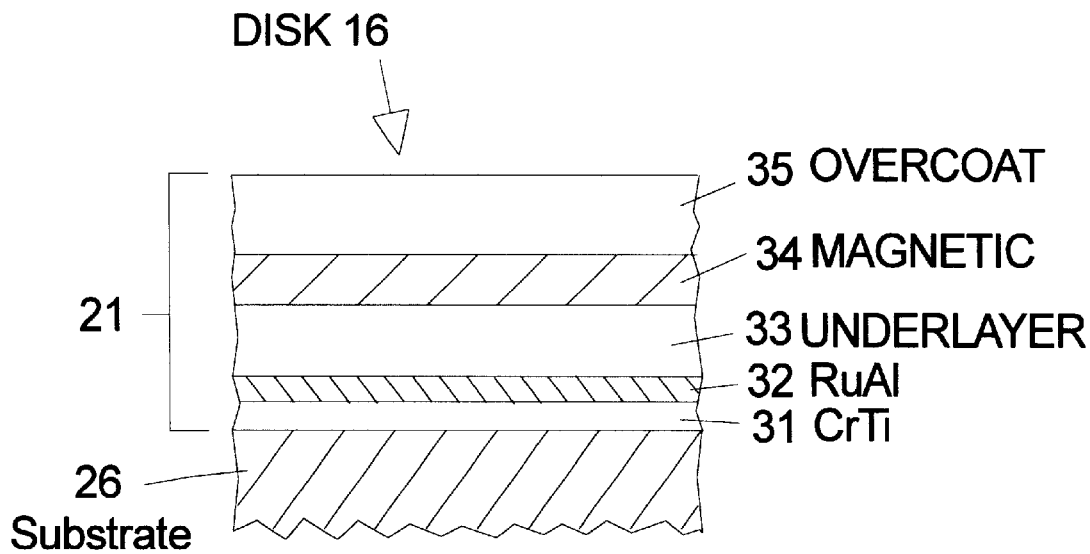
FIG. 2 is an illustration of a layer structure for a magnetic thin film disk according to the invention.
Figure 3:
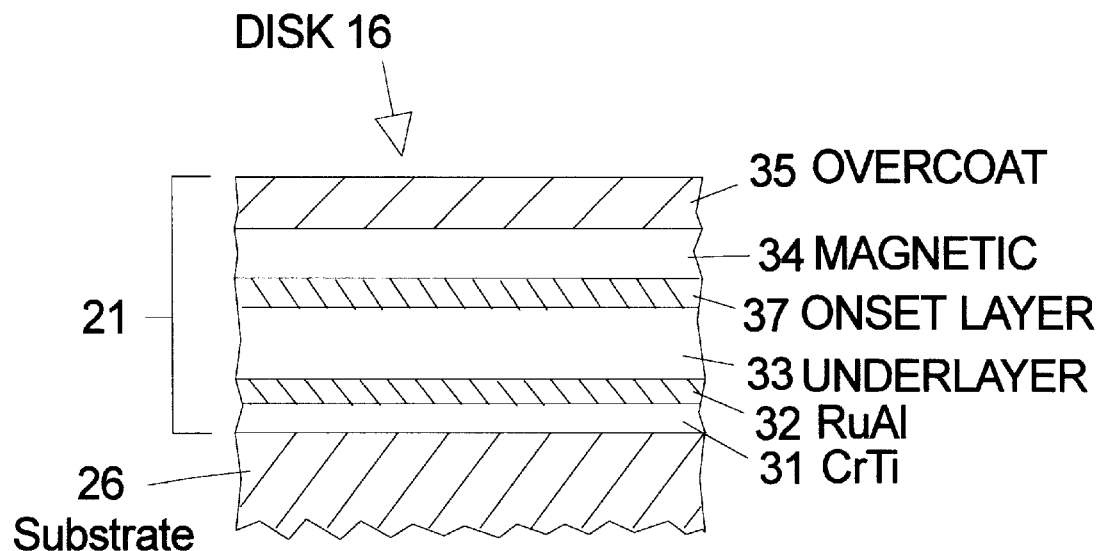
FIG. 3 is an illustration of a layer structure including an onset layer for a magnetic thin film disk according to the invention.

For longitudinal media on glass or other alternative substrates, it is important to control the c-axis in-plane crystallographic orientation and grain size of the magnetic cobalt alloy film. Continued improvements in signal-to-noise ratio (SNR) are also needed to further increase the areal recording density for magnetic media. The pre-seed layer described herein is an amorphous or nanocrystalline layer of CrTi alloy which is preferably followed by a crystalline layer of RuAl. This structure may also be referred to as a CrTi/RuAl bi-layer structure. Reference is made to FIGS. 2 and 3 to illustrate the thin film layers in a magnetic film disks 16 embodying the invention. In the embodiments shown in FIGS. 2 and 3 the CrTi layer 31 is sputter deposited directly onto the substrate surface 26 which may be glass or any other appropriate material or surface.

The CrTi layer also allows the following RuAl layer 32 to be kept very thin, thus saving on the high cost of RuAl. The chromium based underlayer 33 may also be kept very thin when CrTi is used.

It is known that the cobalt alloy magnetic films may be grown with the in-plane preferred orientations of (10$\bar{1}$0) or (11$\bar{2}$0) by first depositing an underlayer with a (112) or (200) preferred orientations respectively. Co-pending, commonly assigned U.S. patent applications bearing Ser. Nos. 09/295, 267 and 09/547,439 describe the use of a RuAl seed layer with a B2 crystallographic structure to obtain an underlayer with a preferred in-plane orientation of (200) and a cobalt alloy magnetic film with the preferred in-plane orientation of (11$\bar{2}$0). Co-pending, commonly assigned U.S. patent application bearing Ser. No. 09/500,710 describes the use of an amorphous or nanocrystalline CrTa or AlTi as a pre-seed layer, sputter deposited onto a nonmetallic substrate, such as glass, followed by a RuAl seed layer with B2 structure. As stated in the referenced application, a CrTa or AlTi pre-seed layer allows the use of a thinner RuAl seed layer which results in smaller overall grain size, as well as, a reduction in manufacturing costs by saving on the relatively high cost of ruthenium. The resulting increased coercivity also allows use of a thinner Cr alloy underlayer which also contributes to decreased grain size. The use of a pre-seed layer of CrTa or AlTi improves grain size, grain distribution, in-plane crystallographic orientation, coercivity and SNR.

The CrTi pre-seed layer described herein also allows the use of a thinner RuAl seed layer to reduce the overall grain size, as well as, manufacturing costs from reduced use of ruthenium. The use of the CrTi pre-seed layer increases coercivity which then allows use of a thinner Cr alloy underlayer contributing to decreased grain size. As in the case of the CrTa and AlTi pre-seed layers, the use of a pre-seed layer of CrTi improves grain size, grain distribution, in-plane crystallographic orientation, coercivity and SNR.

In addition to providing excellent magnetic and recording performance, the CrTi pre-seed layer improves the mechanical properties. Specifically the adhesion of the thin films to the glass surface is increased and the resistance to scratching is improved. In an extended high speed load/unload test, the resulting scratched area for a disk with the CrTi pre-seed layer of the invention was 75 pixels while a disk with an AlTi pre-seed layer had 120750 pixels of scratched area. In a test of adhesion to a glass substrate, a disk with the CrTi pre-seed layer of the invention was found to have greater adhesion between the thin films and the substrate than a similar disk with a CrTa pre-seed layer.

A preferred embodiment of the invention in a completed disk includes an onset layer of the type described in U.S. Pat. No. 6,143,388 to Bian, et al. which is commonly assigned with the present application. The onset layer 37 which is illustrated in FIG. 3 is a thin layer between the underlayer 33 and the magnetic layer 34. Onset layer materials include magnetic and nonmagnetic films such as CoCr, CoPtCr, CoPtCrTa and CoPtCrB. A preferred onset layer is $CoCr_{31}$. The preferred magnetic film is CoPtCrB which is generally described in the Doerner, et al. U.S. Pat. No. 5,523,173. The preferred magnetic layer composition in atomic percent is $CoPt_xCr_yB_z$ where:

$10<x<16$;

$18<y<20$; and $6<z<10$.

The optimum platinum percentage (x) depends on the desired coercivity for the product application.

The preferred thickness for the CrTi pre-seed layer is from 10 nm to 100 nm. The preferred compositional range is from 35 at. % to 55 at. % titanium. The RuAl layer is deposited with a B2 crystallographic structure and is, therefore, preferably about 50 at. % aluminum.

Experimental data on magnetic performance for selected experimental disks 1–9 are given in Tables 1–3. Table 1 compares magnetic and recording performance of disks with different pre-seed layers. These disks have a layer structure of:

pre-seed layer/$RuAl_{50}$/$CrTi_{10}$/$CoCr_{31}$/$CoPt_{14}Cr_{18}B_8$ which corresponds to the embodiment of FIG. 3 with a RuAl seed layer 32, $CrTi_{10}$ underlayer 33, a $CoCr_{31}$ onset layer 37 and a $CoPt_{14}Cr_{18}B_8$ magnetic layer 34. In Table 1 data are shown for two disks according to the invention: disk 1 with a $CrTi_{37}$ pre-seed layer and disk 2 with a $CrTi_{45}$ pre-seed layer. Disks 3 and 4 have $CrTa_{50}$ and $AlTi_{50}$ pre-seed layers respectively. The thickness of each of the pre-seed layers is 43 nm. The data show that the CrTi pre-seed layers of the invention yield comparable SNR and DC SNR to the $CrTa_{50}$ and $AlTi_{50}$ pre-seed layers. The coercivities of the four disks vary from 3588 Oe for the AlTi pre-seed layer disk to 4044 Oe for the $CrTa_{50}$ pre-seed layer disk with the two CrTi pre-seed layer disks falling between these at 3849 Oe and 3843 Oe. This set of data illustrates that the CrTi pre-seed layers have a recording performance comparable to previous state-of-the-art pre-seed layers and acceptable magnetic performance.

Table 2 gives data for disks 5–7 which have a layer structure of:

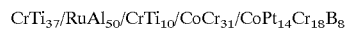
$CrTi_{37}$/$RuAl_{50}$/$CrTi_{10}$/$CoCr_{31}$/$CoPt_{14}Cr_{18}B_8$ and differ only in the thickness of the $CrTi_{37}$ pre-seed layer. These data indicate the increase in the thickness of the $CrTi_{37}$ pre-seed layer from 20 nm, 43 nm to 71 nm corresponds with dramatic increases in coercivity from 3931 Oe, 4074 Oe to 4303 Oe respectively with little change in Mrt.

Table 3 gives data for disks 8–10 which have a layer structure of:

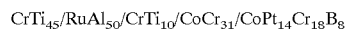
$CrTi_{45}$/$RuAl_{50}$/$CrTi_{10}$/$CoCr_{31}$/$CoPt_{14}Cr_{18}B_8$ and differ only in the thickness of the $CrTi_{45}$ pre-seed layer. These data indicate the increase in the thickness of the $CrTi_{45}$ pre-seed layer from 20 nm, 43 nm to 71 nm corresponds with increases in coercivity from 3979 Oe, 4154 Oe to 4319 Oe respectively with little change in Mrt.

TABLE 1

| Disk | Pre-Seed Layer | Hc (Oe) | Mrt (memu/cm2) | SNR (dB) | DC SNR (dB) |
|---|---|---|---|---|---|
| 1 | $CrTi_{37}$ | 3849 | 0.316 | 19.4 | 35.0 |
| 2 | $CrTi_{45}$ | 3843 | 0.319 | 19.3 | 34.9 |
| 3 | $CrTa_{50}$ | 4044 | 0.315 | 19.3 | 34.6 |
| 4 | AlTi | 3588 | 0.325 | 19.4 | 35.2 |

TABLE 2

| Disk | Pre-Seed Layer | Thickness (nm) | Hc (Oe) | Mrt (memu/cm2) |
|---|---|---|---|---|
| 5 | $CrTi_{37}$ | 20 | 3931 | 0.356 |
| 6 | $CrTi_{37}$ | 43 | 4074 | 0.352 |
| 7 | $CrTi_{37}$ | 71 | 4303 | 0.358 |

TABLE 3

| Disk | Pre-Seed Layer | Thickness (nm) | Hc (Oe) | Mrt (memu/cm2) |
|---|---|---|---|---|
| 8 | $CrTi_{45}$ | 20 | 3979 | 0.363 |
| 9 | $CrTi_{45}$ | 43 | 4154 | 0.359 |
| 10 | $CrTi_{45}$ | 71 | 4319 | 0.357 |

Figure 4:
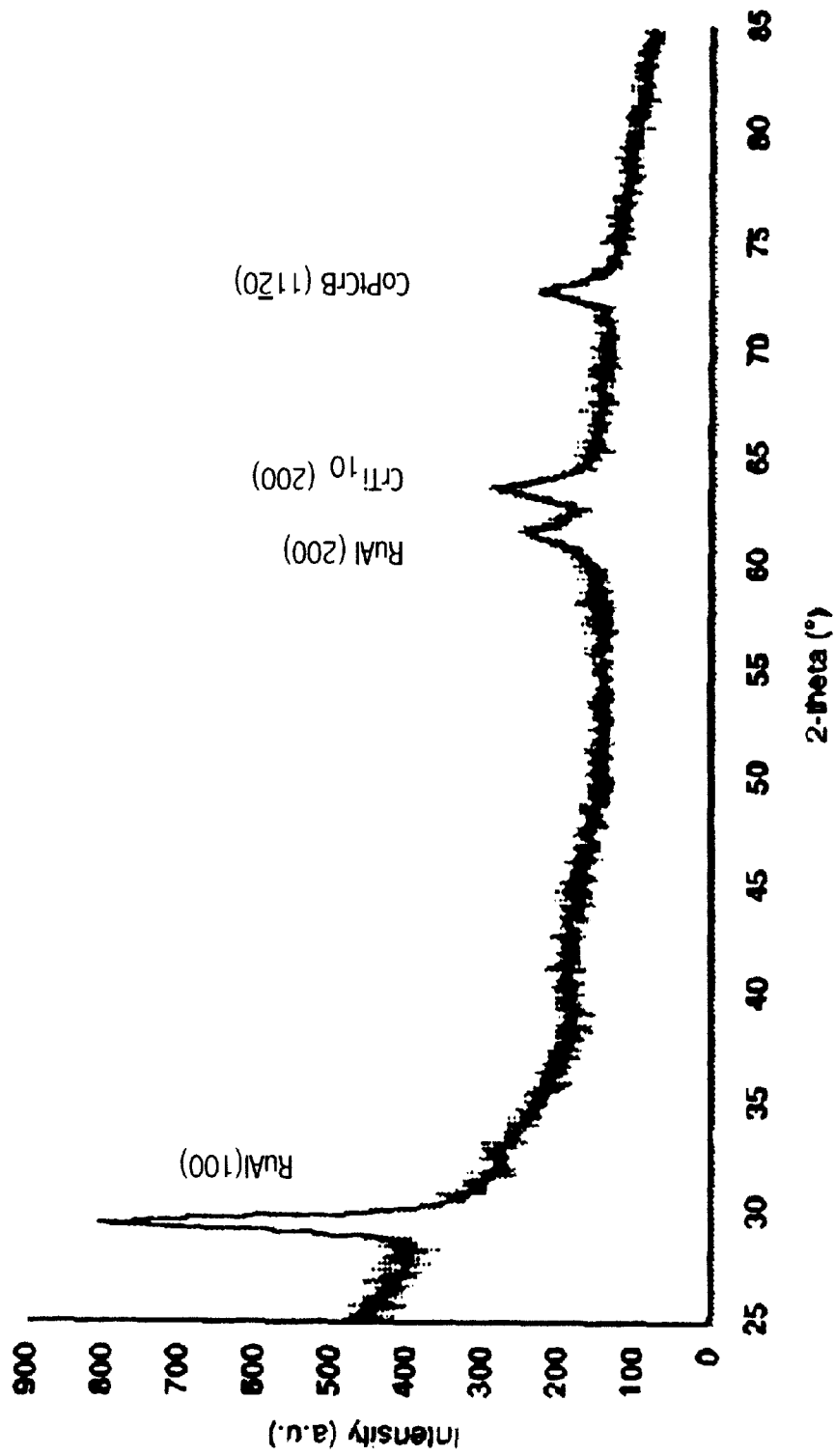
FIG. 4 is an x-ray diffraction plot for a thin film disk structure including a pre-seed layer of $CrTi_{37}$ and a seed layer of $RuAl_{50}$ according to the invention.

X-ray diffraction data for a thin film disk according to the invention is shown in FIG. 4. The layer structure is:

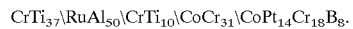
$CrTi_{37}$\$RuAl_{50}$\$CrTi_{10}$\$CoCr_{31}$\$CoPt_{14}Cr_{18}B_8$.

Figure 5:
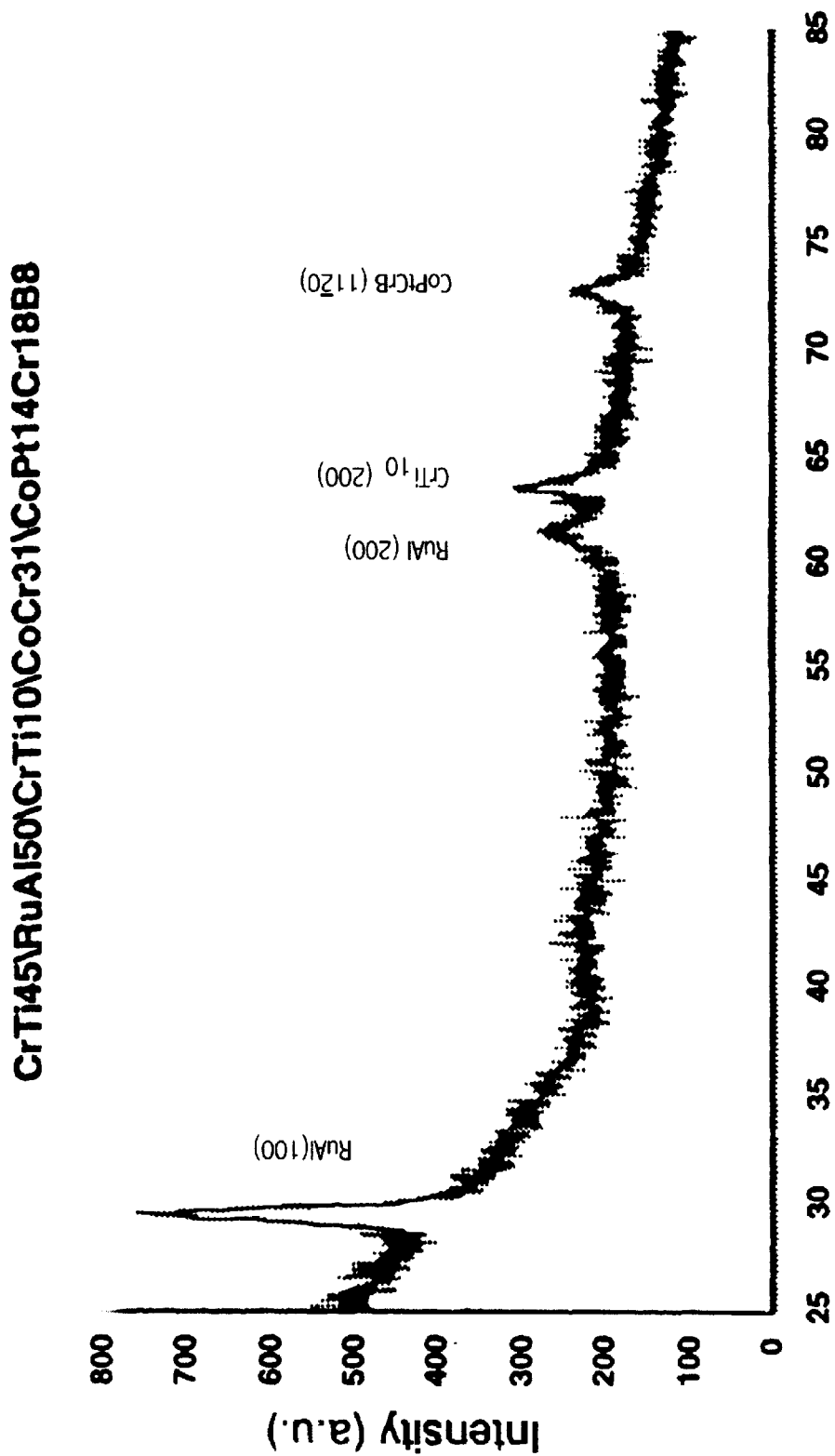
FIG. 5 is an x-ray diffraction plot for a thin film disk structure including a pre-seed layer of $CrTi_{45}$ and a seed layer $RuAl_{50}$ according to the invention.

FIG. 5 shows x-ray diffraction data for a second disk with a $CrTi_{45}$ pre-seed layer and otherwise identical layers with the disk of FIG. 4. Both disks show strong diffraction peaks of (200) of the RuAl seed layer, (200) of the $CrTi_{10}$ underlayer and ($11\bar{2}0$) of the cobalt alloy magnetic layer. These indicate good in-plane orientation which is desirable for longitudinal magnetic recording. The x-ray diffraction data also show no obvious peaks which could be attributed to the CrTi pre-seed layer and, therefore, indicate that the CrTi pre-seed layer is amorphous or nanocrystalline.

The atomic percent compositions given above are given without regard for the small amounts of contamination that invariably exist in sputtered thin films as is well known to those skilled in the art.

The invention has been described with respect to particular embodiments, but other uses and applications for the bilayer structure comprising a CrTi pre-seed layer and a RuAl seed layer will be apparent to those skilled in the art.

What is claimed is:

1. A thin film layer structure comprising:
    a layer of CrTi having from 35 to 55 at. % Ti and having an amorphous or nanocrystalline structure; and
    a layer of RuAl above the layer of CrTi, the RuAl having a B2 crystallographic structure.

2. The thin film layer structure of claim 1 wherein the layer of CrTi is deposited on a glass substrate.

3. A magnetic thin film storage device comprising:
    a substrate;
    a layer of CrTi deposited on the substrate, the CrTi having an amorphous or nanocrystalline structure;
    a layer of RuAl over the layer of CrTi; and
    at least one magnetic layer over the layer of RuAl.

4. The magnetic thin film storage medium of claim 3 wherein the CrTi has from 35 to 55at. % Ti.

5. The magnetic thin film storage medium of claim 3 wherein the CrTi has approximately from 37 to 45 at. % Ti.

6. The magnetic thin film storage medium of claim 2 wherein the RuAl has a B2 crystallographic structure.

7. The magnetic thin film storage medium of claim 3 wherein the CrTi is approximately from 10 to 100 nm thick.

8. A method of fabricating a magnetic thin film storage device comprising the steps of:
    depositing a layer of CrTi on a substrate, the CrTi having an amorphous or nanocrystalline structure;
    depositing a layer of RuAl over the layer of CrTi; and
    depositing a plurality of layers over the layer of RuAl, including at least one magnetic layer.

9. The method of claim 8 wherein the CrTi has from 35 to 55 at. % Ti.

10. The method of claim 8 wherein the CrTi has approximately from 37 to 45 at. % Ti.

11. The method of claim 8 wherein the RuAl has a B2 crystallographic structure.

12. The method of claim 8 wherein the CrTi is from approximately from 10 to 100 nm thick.

13. A disk drive comprising:
    a magnetic transducer including a read and a write head;
    a spindle; and
    a magnetic thin film disk mounted on the spindle, the magnetic thin film disk including a layer of CrTi having an amorphous or nanocrystalline structure followed by a layer of RuAl and at least one magnetic layer.

14. The disk drive of claim 13 wherein the CrTi has from 35 to 55 at. % Ti.

15. The disk drive of claim 13 wherein the CrTi has approximately from 37 to 45 at. % Ti.

16. The disk drive of claim 13 wherein the RuAl has a B2 crystallographic structure.

17. The disk drive of claim 13 wherein the CrTi is approximately from 10 to 100 nm thick.

* * * * *